United States Patent [19]

Gulish, Jr.

[11] 4,106,683
[45] Aug. 15, 1978

[54] GLASS BREAKING OUT APPARATUS
[75] Inventor: William P. Gulish, Jr., Curtice, Ohio
[73] Assignee: Libbey-Owens-Ford Company, Toledo, Ohio
[21] Appl. No.: 823,582
[22] Filed: Aug. 11, 1977
[51] Int. Cl.² .............................................. C03B 33/04
[52] U.S. Cl. .................................... 225/103; 225/96.5
[58] Field of Search ........................... 225/103, 96.5, 2

[56] References Cited
U.S. PATENT DOCUMENTS

| 2,150,391 | 3/1939 | Morris | 225/97 |
| 2,259,765 | 10/1941 | Morris | 225/93 |
| 3,770,173 | 11/1973 | Carothers et al. | 225/2 |
| 4,046,300 | 9/1977 | Welker | 225/103 |

Primary Examiner—Frank T. Yost
Attorney, Agent, or Firm—Collins, Oberlin & Darr

[57] ABSTRACT

An improved template for use in a glass break-out apparatus having a major marginal edge substantially corresponding to the scored pattern inscribed on a glass blank and formed with discrete extensions protruding outwardly of the major marginal edge at the corners of the template for facilitating a smooth break-out of the finished piece with resultant straight and even peripheral edges.

6 Claims, 7 Drawing Figures

FIG. 1

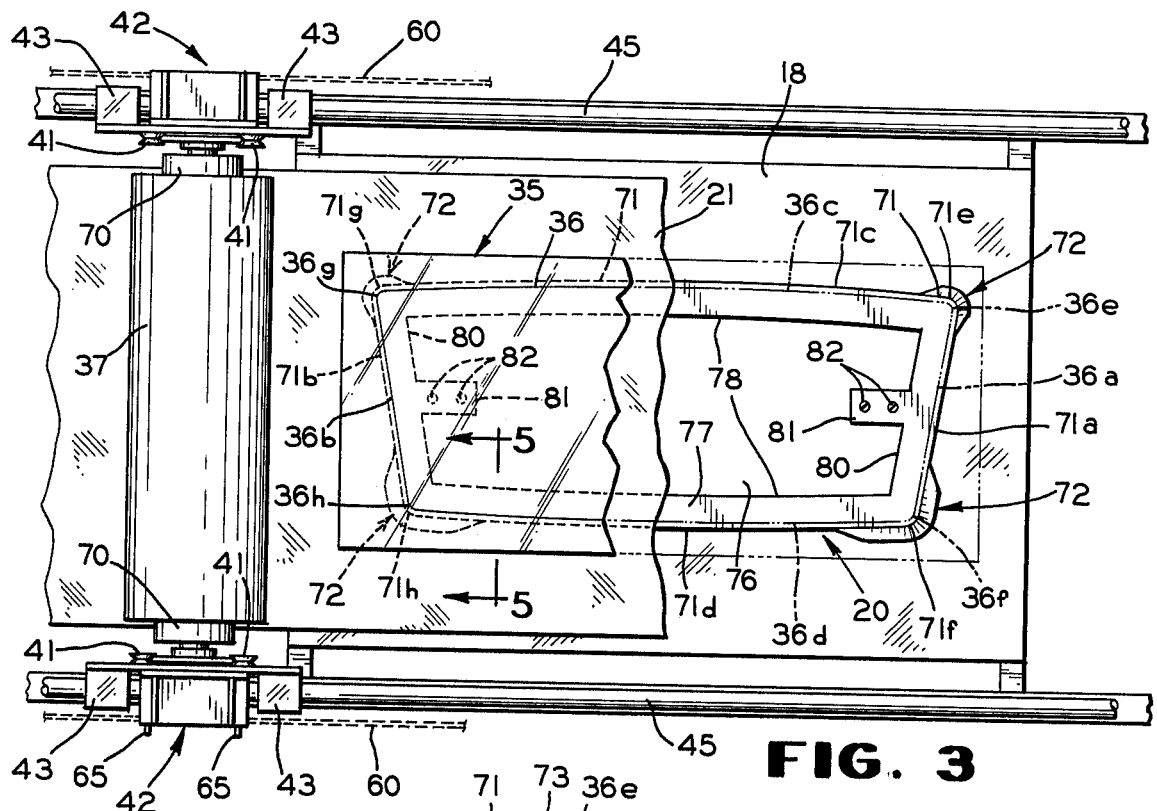
FIG. 3
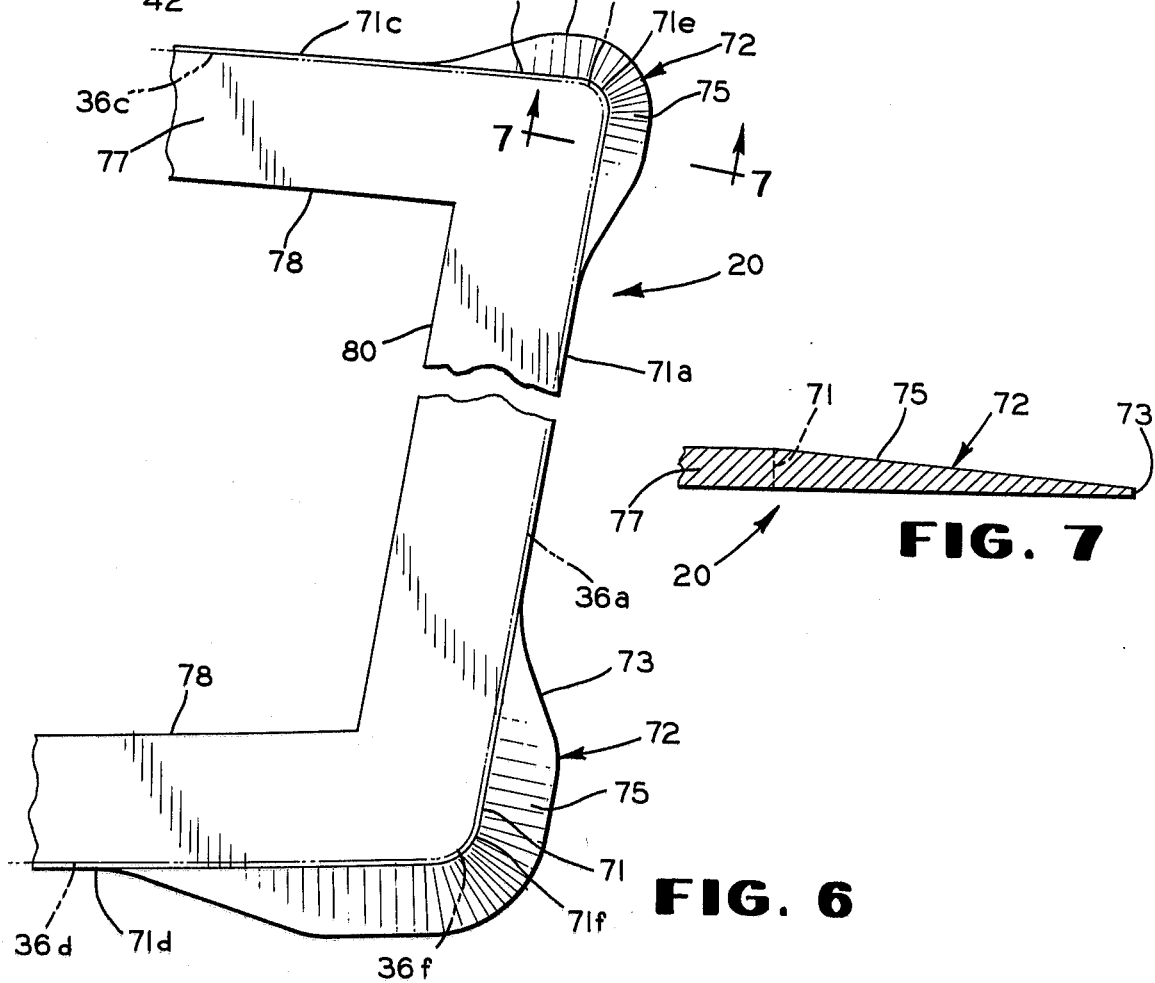
FIG. 7
FIG. 6

1

GLASS BREAKING OUT APPARATUS

BACKGROUND OF THE INVENTION

The present invention relates generally to the cutting of glass and, more particularly, to the breaking out of glass sheets of predetermined patterns from oversized glass blanks.

In a glass production operation, oversized glass sheets or blanks are cut or trimmed to final size for use in specific applications, such as for glazing closures in automobiles and the like. In recent years, apparatus has been developed to automtically break out the desired prescored glass pattern from a glass blank. Generally, such apparatus includes a flat supporting surface for supporting a rigid break out template having an outside configuration approximating the prescored pattern inscribed on the glass blank to be trimmed. The blank is supported on a conveyor belt sandwiched between the glass blank and the template. The apparatus includes means for accurately positioning the blank on the conveyor and vertically aligning the same relative to the underlying template located beneath the conveyor belt.

A suitable pressure applying means, such as a resilient roller for example, mounted above the glass blank, is brought into pressure contact therewith to crack off the marginal strip portions of the blank along the score line about the peripheral edges of the template and break out the desired glass pattern. The finished broken out glass piece is then removed and the conveyor belt is actuated to remove the relatively narrow severed strip portions trimmed off the finished piece.

A problem encountered with these prior known break out devices is the difficulty in consistently obtaining a uniform clean break out of the prescored glass pattern. Very often the break out yields chipped, flared or ragged edges, especially at or adjacent the corners of the finished pieces, resulting in considerable marginal waste and decreased yields.

SUMMARY OF THE INVENTION

Accordingly, it is a primary object of the present invention to provide a new and improved apparatus applying pressure for breaking out a finished glass piece from a scored sheet in a manner leaving clean, square edges free from chipping, flares and irregularities.

It is another object of this invention to provide in the foregoing apparatus an improved template having peripheral, tapered extensions at the corners thereof to facilitate a uniform snapping off of the narrow marginal strip portions of the blank along the score line of the glass pattern.

It is a further object of the present invention to provide an improved template which is simple and strong in construction, low in cost, rugged and durable in use, and which facilitates uniform breaking out of the scored glass pattern.

The foregoing and other objects, advantages, and characterizing features of the present invention will become clearly apparent from the ensuing detailed description thereof, considered in conjunction with the accompanying drawings, wherein like reference numerals denote like parts throughout the various views.

BRIEF DESCRIPTION OF THE DRAWINGS

FIG. 1 is a perspective view of a glass break out apparatus embodying the novel features of the present invention;

FIG. 3 is a top plan view of the apparatus of FIG. 1, partly broken away for clarity to illustrate the improved template constructed in accordance with the present invention;

FIG. 6 is an enlarged, fragmentary top plan view of an end portion of the template shown in FIG. 3; and FIG. 7 is a vertical sectional view, on an enlarged scale taken along the line 7—7 of FIG. 6.

DESCRIPTION OF THE PREFERRED EMBODIMENT

Figure 1:
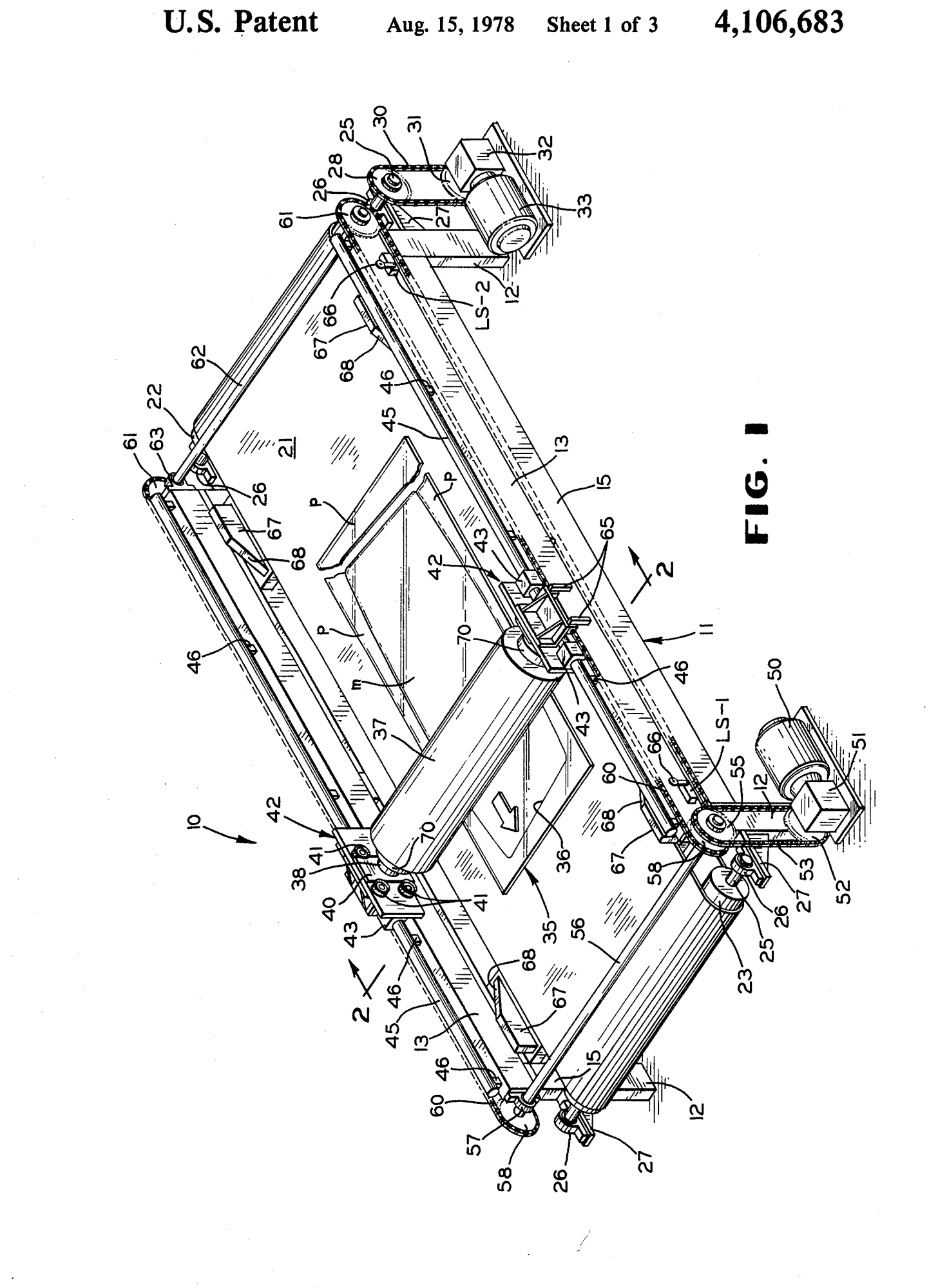
Figures 2, 4, 5:
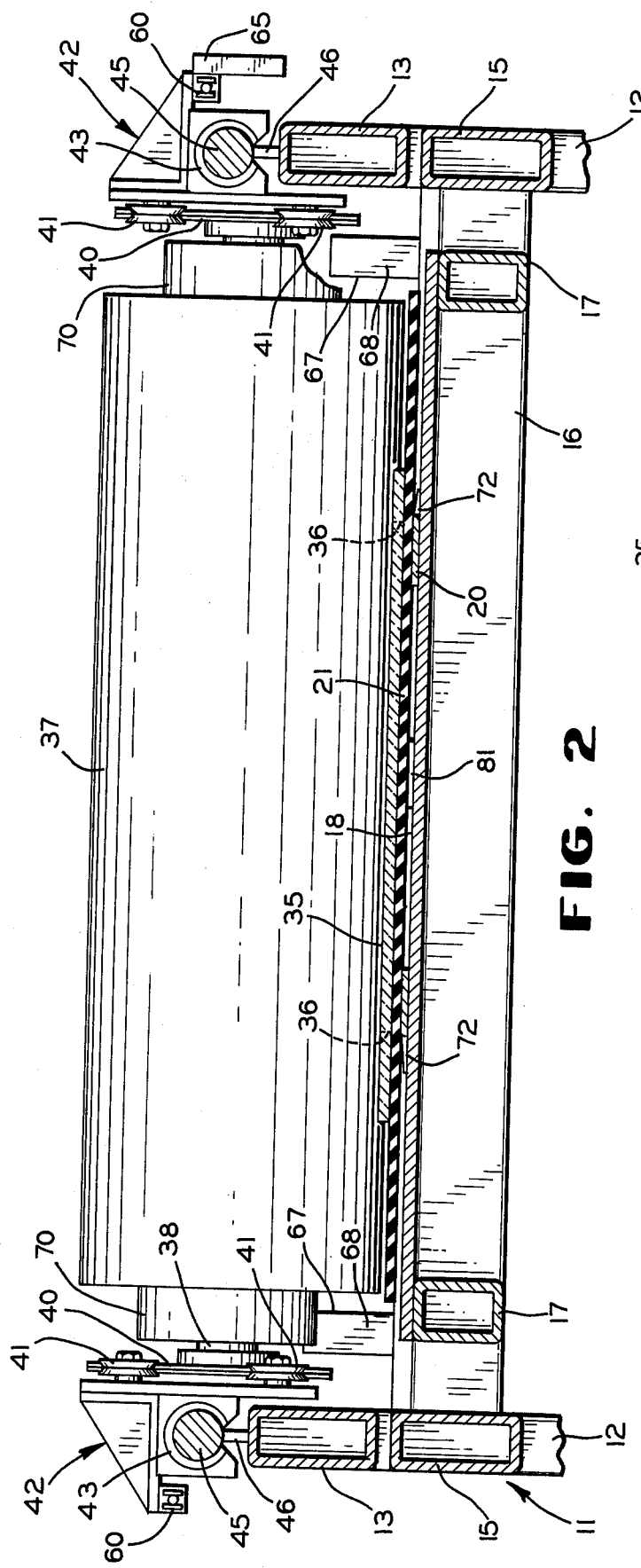
FIG. 2 is a cross sectional view, on an enlarged scale, taken along the line 2—2 of FIG. 1.
FIG. 4 is a fragmentary vertical sectional view, showing a conventional template of the prior art in use in a glass break out operation.
FIG. 5 is an enlarged, sectional view, on an enlarged scale, taken along the line 5—5 of FIG. 3 and showing the relationship of the template of this invention with the prescored glass pattern of the glass blank.

Referring now in detail to the illustrative embodiment depicted in the accompanying drawings, there is shown in FIG. 1 a glass break out apparatus, comprehensively designated 10, comprising a frame 11 including a plurality of upstanding legs or posts 12 connected at their upper ends by vertically spaced, external longitudinally extending, horizontal structural members 13 and 15. Suitable transversely extending structural cross members 16 (FIG. 2) are welded or otherwise fixedly secured at their opposite ends to structural members 15, respectively. A pair of internal, longitudinally extending, horizontal structural members 17 extend between and are suitably connected at their opposite ends to cross members 16. Members 17 are located inwardly of structural members 15 in spaced, parallel relation thereto and support a smooth flat slab forming a table 18 upon which is located the pattern or template 20, constructed in accordance with this invention and which will hereinafter be described in detail.

An endless conveyor belt 21 is mounted on frame 11 with the active run thereof disposed above table 18 in overlying relation to template 20. The conveyor 21 is trained about a drive roll 22 and an idler roll 23 located at the opposite ends of the table 18, respectively, for movement in the direction of the arrow or a generally left-to-right direction, as viewed in FIG. 1. The rolls 222 and 23 are mounted on shafts 25 suitably journalled for rotation at their opposite ends in bearings 26 carried by brackets 27 which are rigidly secured to the legs 12. The shaft of the drive roll 22 is provided with a sprocket 28 driven by an endless drive chain 30 entrained about a drive sprocket 31 operatively connected for rotation, by way of gear reduction mechanism 32, to a suitable power source such as an electric motor 33 for example.

The glass blank 35 to be trimmed (FIGS. 1 and 3) has a generally rectangular configuration in plan and is scored along the line 36 conforming substantially to the pattern or final glass outline desired at a station preceding the breaking out operation. The outline of score line 36 includes two spaced, generally transversely extending score line portions 36a and 36b and a pair of spaced, generally longitudinally extending score line portions 36c and 36d joined at their one ends to portion 36a at rounded corner portions 36e and 36f and at their other ends to portion 36b by rounded corner portions 36g and 36h. The glass blank 35 is adapted to be positioned and supported on conveyor belt 21 in a manner orienting the scored pattern 36 of blank 35 in substantial vertical registry with the marginal edge of the template 20 disposed beneath belt 21 as will hereinafter be more fully explained.

An elongated, weighted, resiliently yieldable roller 37 is mounted above the table 18 and is provided with a support shaft 38 suitably journalled at the opposite ends thereof in bearings (not shown) encased in slide members 40 guided for movement in a vertical direction by two pairs of opposed, peripherally grooved guide rollers 41. The guide rollers 41, in turn, are mounted on carriages 42 located at opposite sides of the table 18 for movement in unison in a rectilinear or horizontal direction longitudinally along the table 18. Each carriage 42 is provided with a pair of axially spaced bushings 43 adapted to partially encompass and slide on an elongated, horizontally extending shaft or guide rail 45 connected along its lower side to the upper end of structural channel member 13 by a plurality of longitudinally spaced support blocks 46. Thus, roller 37 is mounted for free vertical movement by virtue of the slide-roller arrangement 40 and 41 and for movement in a horizontal direction by means of carriages 42. Since the specific construction of roller 37 and its mounting on slide members 40 are not the essence of this invention, no further amplification or description thereof is believed necessary. For a detailed description of such a roll structure and the mounting therefor, reference may be had to U.S. patent application Ser. No. 691,903, filed June 1, 1976, and assigned to the same assignee as the instant application.

The means for reciprocating carriages 42 in unison along table 18 includes an electric motor 50 connected to a suitable source of electrical power (not shown) for rotating, via gear reducer 51, a drive sprocket 52 having a drive chain 53 entrained thereabout and about an idler sprocket 55 secured to a drive shaft 56 for rotating the same. The drive shaft 56 extends transversely across table 18 adjacent one end thereof and is suitably journalled in spaced bearing blocks 57 secured to the ends of structural channel members 13. The drive shaft 56 is provided adjacent its ends with drive sprockets 58 about which drive chains 60 are entrained about idler sprockets 61 mounted on a common shaft 62 extending transversely of table 18 adjacent the other end thereof and journalled for rotation in spaced bearing blocks 63 secured to the other ends of structural channel members 13. Thus, the drive arrangement described above is operative to move carriages 42 in unison and thereby roller 37 longitudinally back and forth across table 18.

A pair of spaced, switch actuating levers 65 depend downwardly from one of the carriages 42 for engagement with actuators 66 of longitudinally spaced limit switches LS-1 and LS-2, respectively, mounted on the outside wall of structural member 13 adjacent the ends of table 18. Thus, as carriages 42 and thereby roller 37 advances and approaches one end of its travel, say leftwardly as viewed in FIG. 1 for example, the leading switch actuator lever 65 will engage and trip the actuator 66 of switch LS-1 to either reverse the polarity of motor 50 and effect reverse travel of the roller 37 or deenergize the circuit to stop roller movement, as desired.

In order to support the weighted roller 37 off and above table 18 and conveyor belt 21 to permit travel of the latter for advancing the resultant cullet and, in certain instances, the broken out piece to the next processing station, a pair of laterally spaced cam members 67 are mounted on the frame 11 adjacent each end of table 18 on opposite sides of the conveyor belt 21. These cam members 67 are provided with inclined cam surfaces 68 engageable by circular cam followers 70 mounted on support shaft 38 against the opposite ends of roller 37. As the roller 37 approaches the end of its stroke in either direction, followers 70 engage and ride up the inclined surfaces 68 of cam members 67 to bodily lift the roller 37 off conveyor belt 21 to a vertical resting position spaced sufficiently above belt 21 to provide the necessary clearance for the passage of the finished severed glass therethrough.

Suitable glass blank alignment and positioning means (not shown) can be employed to accurately position the glass blank 35 on conveyor belt 21 in a manner vertically aligning the scored pattern or outline 36 with the marginal edge of the template 20 disposed beneath conveyor belt 21. The glass blank 35 can be advanced into the desired position on belt 21 or be deposited onto the belt 21 when stationary by means of overhead loading devices, such as vacuum cup transfer mechanisms and the like for example, which are not shown but are conventional and well known in the art.

In a typical prior art automated glass break out operation, a glass blank having a prescored pattern is accurately placed on the conveyor belt so that the prescored pattern is in vertical alignment with the marginal edge outline of the template disposed beneath the belt. The roller is then actuated to move from one end of the table to the other and passes over the glass blank during its travel longitudinally of the table. As the roller bears against and rolls over the glass blank, the cooperative action of the weighted, pliable roller applying a uniform pressure to the glass blank and the supporting of the blank proximate the scored pattern by the template effect the break out of the glass along the desired scored pattern.

In operation, as the roller moves leftwardly, for example as viewed in FIG. 1, it first engages and traverses the leading end of the blank to fracture the glass along the leading transverse score line portion 36a and start the fracture running about corners 36e, 36f and along longitudinal score line portions 36c and 36d. Continued advancement of the roller causes the fracture or cut to run progressively slightly ahead of the roller along score line portions 36c and 36d. As the roller approaches the trailing edge of the blank, the cuts along both sides sweep about the corners 36g, 36h and merge along the transverse score line portion 36b to complete the break out.

The roller provides the necessary bending moment for cracking off the marginal portions of the blank, i.e. those portions outwardly of the score line, about the marginal edge of the template. For purposes of this description, these marginal strip portions to be trimmed are identified by the reference character p and the remaining body portion of the blank that will constitute the finished piece is designated m. The bending moment imposed by the roller creates a fracture which starts at the score line along the upper surface of the blank and is propagated inwardly through the thickness of the blank along the line of fracture to the opposite or lower surface thereof, continually running longitudinally in the pattern described above. As best shown in FIG. 4, when cutting through the thickness of the blank, there is a tendency for the marginal strip portion $p$ to move outwardly in a generally arcuate path about a pivot axis or lower juncture x away from the major portion m of the glass blank.

Heretofore, prior known break out templates, as shown in FIG. 4, were configured with a marginal edge outline conforming in its entirety to the dimensions and desired scored pattern inscribed on the glass blank. With such known templates, there was a high incidence of chipping and spalling, especially in the regions of the corners, adjacent the lower surface of the blank at the bottom of the line of fracture or at the lower juncture x of blank portions m and p, as shown in FIG. 4. It is believed that this undesirable corner chipping or tearing is due to the opposite reaction forces or crushing, compressive stresses concentrated in the region of this lower juncture x as a result of the spreading apart or outward movement of the severed glass blank portions m and p at the upper end of the fracture. There is a tendency for the severed marginal strip portion p to be flexed completely about the peripheral edge of the template producing concentrated compressive stresses or crushing forces localized in the area of the lower juncture x.

The present invention contemplates reducing such compressive forces in the regions of the corners adjacent this lower juncture at the bottom of the line of fracture to minimize, if not completely eliminate, the incidence of chipping or spalling by the use of a new and improved, specially configured template 20. As best shown in FIGS. 3, 5 and 6, the template 20, constructed according to this invention, has a major marginal edge 71 approximating in planar dimensions and outlines, but preferably slightly larger than, the horizontal dimensions and configuration of the prescored pattern 36 inscribed on the glass blank 35. The outline of major marginal edge 71 is complementary, but slightly larger than, the scored pattern 36 and includes opposite transverse edge portions 71a and 71b and a pair of opposite longitudinal edge portions 71c and 71d formed integral at their one ends with edge portion 71a to form corner edge portions 71e and 71f, respectively. The other ends of longitudinal edge portions 71c and 71d are joined to transverse edge portion 71b at corner edge portions 71g and 71h, respectively.

In accordance with this invention, radially projecting extensions 72 are provided at the corners, respectively, of template 20 and terminate in peripheral edges 73. Each extension 72 is in the form of a lip or flange integral with and projecting outwardly from the major marginal edge 71 of the template. The peripheral edge 73 of each extension 72 is somewhat arcuately curved at the central portion thereof, following the contour of the associated major marginal edge rounded corner portion and then extends lengthwise in both directions away from such corner in spaced parallel relation to the angularly related marginal edge longitudinal and transverse edge portions for a limited distance. This peripheral edge 73 then tapers inwardly at its opposite ends toward the major marginal edge 71 and finally merges therewith along the longitudinal and transverse edge portions of major marginal edge 71. As best shown in FIG. 7, the extensions 72 are formed with upper inclined surfaces 75 tapering downwardly from the major marginal edge 71 toward the free ends or the peripheral edges 73 thereof.

The tapered surfaces 75 of extensions 72 offer support for the marginal glass portions p when cracked off and significantly limit the extent of downward bending thereof at the corners of the broken out piece to minimize the compressive, crushing forces acting on the lower juncture x of portions m and p at these corners whereby breakage or damage resulting from chipping or spalling of the broken out sheet edges is reduced to a minimum. As a result, a clean and uniform break throughout can be effected to yield smooth and even edges around the entire periphery of the finished piece with such edges lying in a plane perpendicular to the major planar surfaces of the piece.

It should be understood that a relatively large bending moment must be applied to the glass along the transverse score line portion 36a and longitudinal score line portions 36c and 36d to generate sufficient snapping off momentum to cause the cut to curve smoothly and break out arcuately about score line corner portions 36e–36h, respectively. This is assured by the elongated major marginal edge portions 71a–71d located in substantial vertical alignment with the overlying scored pattern 36 between adjacent corners, respectively, and which, in combination with the pressure applying roller 37, generates the requisite bending moment. If extensions 72 were continuous about the entire major marginal edge 71, the bending moment generated therealong would not be adequate to effect a continuous, curving fracture about score line corner portions 36e–36h. Accordingly, not only must extensions 72 have sufficient mass to offer the necessary support for marginal glass portions p adjacent corner portions 36e–36h to limit the bending moment applied at these critical corners of the blank to minimize the compressive stresses acting in these regions, they must also be limited in arcuate extent so as not to interfere with the greater bending moment along the transverse and longitudinal score line portions 36a and 36c, 36d necessary to effect the arcuately running cut about the score line corner portions 36e–36h. The particular width of each extension 72 and its arcuate span is dictated by the dimensions and configuration of the piece to be broken out and will vary, accordingly. Generally, the greater the arc formed by the major marginal corner edge portions 71e–71h, the greater the width and arcuate span of the associated extensions 72. In any event, however, the arcuate extent of extensions 72 for the full width thereof is greater than the arcuate extent of the associated major marginal corner edge portions 71e–71h to project longitudinally therepast and then are progressively diminished in width to blend into the major marginal edge 71 and thereby define a relatively large space between adjacent extensions 72.

Since only the peripheral or marginal edge of the template 20 is significant for the break out operation, the template is formed with a large open area 76 centrally thereof, leaving a border-like band 77 constituting the body of template 20 and comprised of opposed longitudinally extending portions 78 and opposed transversely extending portion 80. Opposed mounting brackets 81 (FIG. 3) are formed integral with the transverse portions 80 of band 77 and project inwardly toward each other. Suitable openings are formed in brackets 81 for receiving fasteners 82 to facilitate mounting of the template 20 on table 18.

In operation, with the roller 37 disposed in an elevated position at one end of table 18, a glass blank 35 is loaded and accurately positioned on the now stationary conveyor belt 21 with the scored pattern 36 properly oriented relative to the major marginal edge 71 of template 20, which is slightly larger than the scored pattern 36, as best shown in FIGS. 3 and 5. Roller 37 is then actuated to advance over the glass blank 35 until it reaches the end of its stroke whereupon the cam followers 70 engage and ride up the inclined surfaces 68 of cam members 67 to bodily lift the freely suspended roller 37 of belt 21 a sufficient distance to provide adequate clearance for the passage of cullet therethrough upon actuation of the conveyor belt 21. The weighted, pliable roller 37, which is longer than the width of blank 35, fully engages and applies a uniform pressure to the glass blank as it advances thereover. This, together with the cooperative action of supporting the blank near or adjacent to the prescored outline 36 by the template 20 effects a clean and uniform fracture along the score line.

As the blank marginal portions p are cracked off, they tend to move outwardly away from the blank major portion m in an arcuate path of travel about the axis x. However, at the corners of the piece, these marginal portions are almost immediately restrained by the engagement thereof against the inclined surfaces 75 of extensions 72. This limited bending movement imposed by extensions 72 drastically reduces the compressive stresses tending to crush the glass in the area of juncture x at the corners of the finished piece and avoids the chipping or spalling otherwise possible in the absence of such extensions. The broken out or finished piece accordingly is formed with smooth and even edges perpendicular to the opposite planar surface of the piece.

It should be understood that the momentum of the relatively large bending moment generated along straight transverse score line portion 36a at the beginning of the breakout operation facilitates the cut in starting to run arcuately along score line corner portions 36e and 36f, notwithstanding that the bending moment is limited locally at these corner portions by virtue of extensions 72. Once started in the arcuate path, the cut readily follows the same. Likewise, the momentum of the bending moment employed progressively to sever the blank marginal portions p along longitudinal score line portions 36c and 36d upon advancement of the roller 37 therealong also is effective to cause the cut to start running in an arcuate path along score line corner portions 36g and 36h, even though the extensions 72 thereunder are utilized to limit the bending moment locally at these corner portions 36g and 36h.

Upon completion of the breakout operation, the trimmed finished piece can then be lifted and removed from conveyor belt 21 by a vacuum transfer means or any other suitable unloading apparatus, or removed along with the resultant cullet upon actuation of the conveyor belt 21, as desired.

In an actual production glass break out operation employing the template 20 of this invention, the major marginal edge 71 was of a polygonal shape and plan conforming substantially in configuration or outline to the size of the finished glass piece to be broken out, which finished piece was intended for use as a backlight or rear window for an automotive glazing closure. The major marginal edge 71 of template 20 was patterned slightly larger than the prescored outline on the blank so that the former extended about 0.090 inch past the prescored outline 36. The template 20 was formed of aluminum and had a thickness through the body or band 77 of approximately 0.060 inch with the integral extensions 72 at each corner tapering down to a thickness of about 0.040 inch at their peripheral edges. The extensions 72 at the corner marginal edge portions 71f and 71h of larger arcuate extent projected outwardly therefrom a distance of approximately 0.75 inch at its widest dimension and the extensions 72 at the smaller corner marginal edge portions 71e and 71g extended outwardly a distance of approximately 0.50 inch at its widest dimension. The above dimensions are exemplary only and can vary widely in accordance with the size and planar configuration of the piece to be broken out.

From the foregoing, it is apparent that the objects of the present invention have been fully accomplished. A new and improved template is provided for facilitating the break out of desired glass patterns in a more efficient manner. The provision of discrete tapered extensions at the corners of the template assures a uniform and clean snapping off of the marginal strip portions of a glass blank to produce finished pieces having smooth, even and square dedges free from chipping, spalling and surface irregularities.

It is to be understood that the form of the invention herewith shown and described is to be taken as an illustrative embodiment only of the same, and that various changes in the shape, size and arrangement of parts may be resorted to without departing from the spirit of the invention.

I claim:

1. In apparatus for breaking out a scored glass pattern from a glass blank including a supporting surface, a template supported on said supporting surface, a resilient glass supporting means overlying the template, means positioning said glass blank on said resilient glass supporting means to vertically align the score line of said glass blank with said template, and pressure applying means engageable with said glass blank to snap the glass along said score line; the improvement in which said template comprises a body having a generally flat planar surface terminating in a major marginal edge complementary to but slightly larger than the outline of the score line formed on the overlying glass blank, said template having discrete lateral extensions along selective portions of said marginal edge and projecting outwardly therebeyond to limit downward movement of overlying marginal glass portions outwardly of said score line when snapped.

2. Apparatus according to claim 1 wherein said major marginal edge includes arcuately curved portions, and said extensions are formed integral with said arcuately curved portions and project radially outwardly therefrom.

3. Apparatus according to claim 2 wherein each extension has an arcuate span of uniform width greater than the span of the associated arcuately curved edge portion.

4. Apparatus according to claim 3 wherein the width of each extension narrows progressively adjacent its opposite ends from said uniform width toward said marginal edge to merge therewith.

5. Apparatus according to claim 1 wherein each of said extensions has a tapered upper surface inclined downwardly from said major marginal edge toward the peripheral edge of said extension.

6. Apparatus according to claim 1 wherein said template body is of generally trapezoidal outline in plan having an enlarged open area centrally thereof defining opposed longitudinal portions and opposed transverse portions, and mounting brackets formed integral with said transverse portions and extending inwardly toward each other for attaching said template to an underlying support structure.

* * * * *

UNITED STATES PATENT AND TRADEMARK OFFICE
CERTIFICATE OF CORRECTION

PATENT NO. : 4,106,683
DATED : August 15, 1978
INVENTOR(S) : William P. Gulish, Jr.

It is certified that error appears in the above-identified patent and that said Letters Patent are hereby corrected as shown below:

Col. 2, line 47, "222" should be --22--
Col. 3, line 43, after "entrained" insert --. The chains 60 also are entrained--
Col. 7, line 27, "surface" should be --surfaces--
Col. 8, line 15, "square dedges" should be --squared edges--

Signed and Sealed this

Twenty-fifth Day of March 1980

[SEAL]

Attest:

SIDNEY A. DIAMOND

*Attesting Officer*    *Commissioner of Patents and Trademarks*